US012675899B2

(12) United States Patent
Yoshida et al.

(10) Patent No.: US 12,675,899 B2
(45) Date of Patent: Jul. 7, 2026

(54) IMAGE PROCESSING APPARATUS, IMAGE PROCESSING METHOD, AND NON-TRANSITORY STORAGE MEDIUM

(71) Applicant: NEC Corporation, Tokyo (JP)

(72) Inventors: Noboru Yoshida, Tokyo (JP); Tingting Dong, Tokyo (JP)

(73) Assignee: NEC CORPORATION, Tokyo (JP)

( * ) Notice: Subject to any disclaimer, the term of this patent is extended or adjusted under 35 U.S.C. 154(b) by 311 days.

(21) Appl. No.: 18/232,110

(22) Filed: Aug. 9, 2023

(65) Prior Publication Data

US 2024/0062411 A1 Feb. 22, 2024

(30) Foreign Application Priority Data

Aug. 22, 2022 (JP) ................................. 2022-131658

(51) Int. Cl.
*G06T 7/73* (2017.01)
*G06T 7/33* (2017.01)

(52) U.S. Cl.
CPC ................ *G06T 7/73* (2017.01); *G06T 7/337* (2017.01); *G06T 2207/10016* (2013.01); *G06T 2207/30196* (2013.01)

(58) Field of Classification Search
None
See application file for complete search history.

(56) References Cited

U.S. PATENT DOCUMENTS

| 2011/0184953 A1* | 7/2011 | Joshi | G06V 10/464 |
| | | | 707/738 |
| 2019/0147292 A1* | 5/2019 | Watanabe | G06F 16/5838 |
| | | | 382/103 |
| 2022/0138249 A1* | 5/2022 | Xie | G06F 16/56 |
| | | | 707/737 |
| 2023/0214458 A1* | 7/2023 | Marsden | G06V 40/28 |
| | | | 382/157 |

FOREIGN PATENT DOCUMENTS

| JP | 2019-091138 A | 6/2019 |
| JP | 2021-163310 A | 10/2021 |
| WO | 2020/188898 A1 | 9/2020 |
| WO | 2021/229751 A1 | 11/2021 |

OTHER PUBLICATIONS

JP Office Action for JP Application No. 2022-131658, mailed on Nov. 25, 2025 with English Translation.

* cited by examiner

*Primary Examiner* — Vikkram Bali
(74) *Attorney, Agent, or Firm* — Sughrue Mion, PLLC

(57) ABSTRACT

To reduce a load on a computer required for processing of searching for a desired person from among a plurality of images, the present invention provides an information processing apparatus 10 including: an acquisition unit 11 that acquires a query indicating a person attribute; and a search unit 12 that refers to a reference image database in which a plurality of reference images are grouped by putting together into reference images including an identical person and clustered, for each group, by putting together those having a similar predetermined attribute, selects, for each group, a representative reference image from one or each of a plurality of clusters, and collates the selected representative reference image with the query, based on the person attribute.

12 Claims, 11 Drawing Sheets

PLURALITY OF REFERENCE IMAGES

FIG. 4

INPUT/
OUTPUT I/F          3A

5A

PROCESSOR          MEMORY          PERIPHERAL
CIRCUIT 1A          2A          4A

FIG. 5

| REFERENCE IMAGE IDENTIFICATION INFORMATION | GROUP IDENTIFICATION INFORMATION | CLUSTER IDENTIFICATION INFORMATION | · · · · |
|---|---|---|---|
| P000001 | G001 | C003 | · · · · |
| P000002 | G002 | C002 | · · · · |
| ⋮ | ⋮ | ⋮ | |

IMAGE PROCESSING APPARATUS, IMAGE PROCESSING METHOD, AND NON-TRANSITORY STORAGE MEDIUM

This application is based upon and claims the benefit of priority from Japanese patent application No. 2022-131658, filed on Aug. 22, 2022, the disclosure of which is incorporated herein in its entirety by reference.

TECHNICAL FIELD

The present invention relates to an image processing apparatus, an image processing method, and a program.

BACKGROUND ART

A technique relevant to the present invention is disclosed in Patent Document 1 (Japanese Patent Application Publication No. 2019-091138), Patent Document 2 (International Publication No. WO2021/229751), and Patent Document 3 (International Publication No. WO2020/188898).

Patent Document 1 discloses a technique for searching for a desired image by using a pose of a person, an attribute, a feature value of an image, a time, a place, or the like as a search condition.

Patent Document 2 discloses a technique for searching for an image including a person in a desired pose from among a plurality of images.

Patent Document 3 discloses a technique for grouping face images extracted from a plurality of frame images into face images of an identical person. In the technique, images in which an identical person is captured are put together to generate a group, and then a similarity between groups is decided by using a representative image selected from each group.

DISCLOSURE OF THE INVENTION

Use of the technique described in Patent Document 1 or 2 enables searching for a desired person from an image. For example, performing a search by using an appearance attribute of a desired person, a pose taken by the person, or the like as a query enables searching for an image in which the desired person is captured from among a plurality of images, or deciding whether the desired person is captured in a plurality of images.

Incidentally, the larger the number of images to be collated with a query, the greater a load on a computer required for collation processing. For example, when a 1-hour moving image with a frame rate of 30 FPS is to be searched, 108000 frame images are to be collated.

Use of the technique disclosed in Patent Document 3 can reduce a processing load on a computer, by putting together and grouping images in which an identical person is captured, and selecting a representative image from each group and collating the selected representative image with a query. However, when a way of selecting a representative image is inappropriate, a desired result may not be acquired. None of the patent literatures discloses the problem and a solution thereof.

In view of the above-described problem, one example of an object of the present invention is to provide an image processing apparatus, an image processing method, and a program that solve a problem of reducing a load on a computer required for processing of searching for a desired person from among a plurality of images.

According to one aspect of the present invention, provided is an image processing apparatus including:

an acquisition means for acquiring a query indicating a person attribute; and a search means for referring to a reference image database in which a plurality of reference images are grouped by putting together into reference images including an identical person and clustered, for each group, by putting together those having a similar predetermined attribute, selecting, for each group, a representative reference image from one or each of a plurality of clusters, and collating the selected representative reference image with the query, based on the person attribute.

According to one aspect of the present invention, provided is an image processing method including, by one or more computers:

acquiring a query indicating a person attribute; and referring to a reference image database in which a plurality of reference images are grouped by putting together into reference images including an identical person and clustered, for each group, by putting together those having a similar predetermined attribute, selecting, for each group, a representative reference image from one or each of a plurality of clusters, and collating the selected representative reference image with the query, based on the person attribute.

According to one aspect of the present invention, provided is a program causing a computer to function as:

an acquisition means for acquiring a query indicating a person attribute; and a search means for referring to a reference image database in which a plurality of reference images are grouped by putting together into reference images including an identical person and clustered, for each group, by putting together those having a similar predetermined attribute, selecting, for each group, a representative reference image from one or each of a plurality of clusters, and collating the selected representative reference image with the query, based on the person attribute.

According to one aspect of the present invention, an image processing apparatus, an image processing method, and a program that solve a problem of reducing a load on a computer required for processing of searching for a desired person from among a plurality of images are achieved.

BRIEF DESCRIPTION OF THE DRAWINGS

The above-described object and other objects, features, and advantageous effects become more apparent from the preferred example embodiments described below and the following accompanying drawings.

FIG. 4 is a diagram illustrating one example of a hardware configuration of the image processing apparatus.

FIG. 5 is a diagram schematically illustrating one example of information processed by the image processing apparatus.

DESCRIPTION OF EMBODIMENTS

Hereinafter, example embodiments of the present invention will be described by using drawings. Note that, in every drawing, a similar component is given a similar sign, and description thereof is omitted as appropriate.

First Example Embodiment

Figure 1:
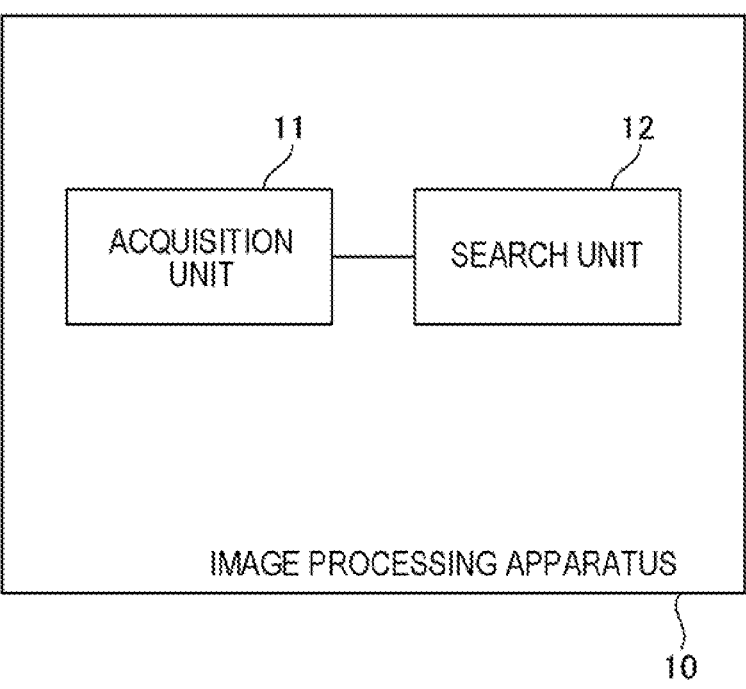
FIG. 1 is a diagram illustrating one example of a function block diagram of an image processing apparatus.

FIG. 1 is a function block diagram illustrating an overview of an image processing apparatus 10 according to a first example embodiment. The image processing apparatus 10 includes an acquisition unit 11 and a search unit 12.

The acquisition unit 11 acquires a query indicating a person attribute. The search unit 12 refers to a reference image database in which a plurality of reference images are grouped by putting together into reference images including an identical person and clustered, for each group, by putting together those having a similar predetermined attribute, selects, for each group, a representative reference image from one or each of a plurality of clusters, and collates the selected representative reference image with the query, based on the person attribute.

The image processing apparatus 10 including such a configuration solves a problem of reducing a load on a computer required for processing of searching for a desired person from among a plurality of images.

Second Example Embodiment

"Overview"

An image processing apparatus 10 according to a second example embodiment is a more specific embodiment of the image processing apparatus 10 according to the first example embodiment.

The image processing apparatus 10 searches for an image including a person indicated by a query from among a plurality of reference images. A plurality of reference images may be a plurality of frame images included in a moving image, or may be a plurality of still images. A query in the present example embodiment indicates a person's appearance attribute and a person's pose.

Incidentally, collating each of a plurality of reference images with a query increases a processing load on the image processing apparatus 10. In view of this, the image processing apparatus 10 performs collation processing with a characteristic approach.

Figure 2:
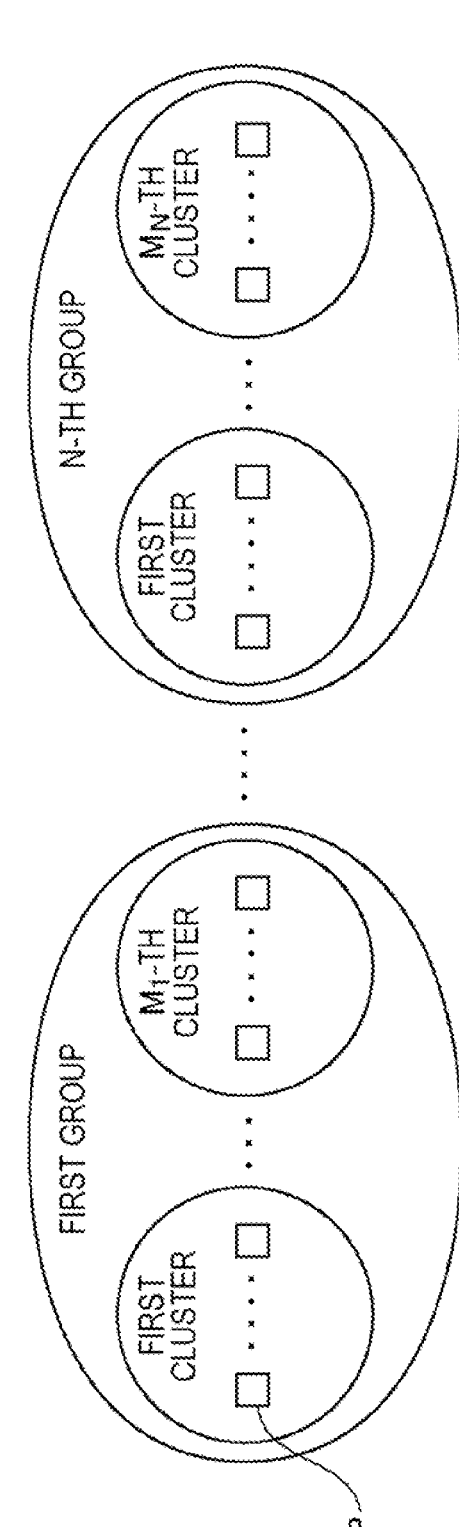
FIG. 2 is a diagram for describing grouping and clustering of a plurality of reference images.

Specifically, first, the image processing apparatus 10 groups a plurality of reference images P by putting together into reference images P including an identical person, as illustrated in FIG. 2. Furthermore, the image processing apparatus 10 clusters reference image P groups belonging to each group by putting together those having a similar person's pose, as illustrated in FIG. 2. For example, a first cluster is a set of reference images P including a person in a standing pose, and a second cluster is a set of reference images P including a person in a sitting pose.

Figure 3:
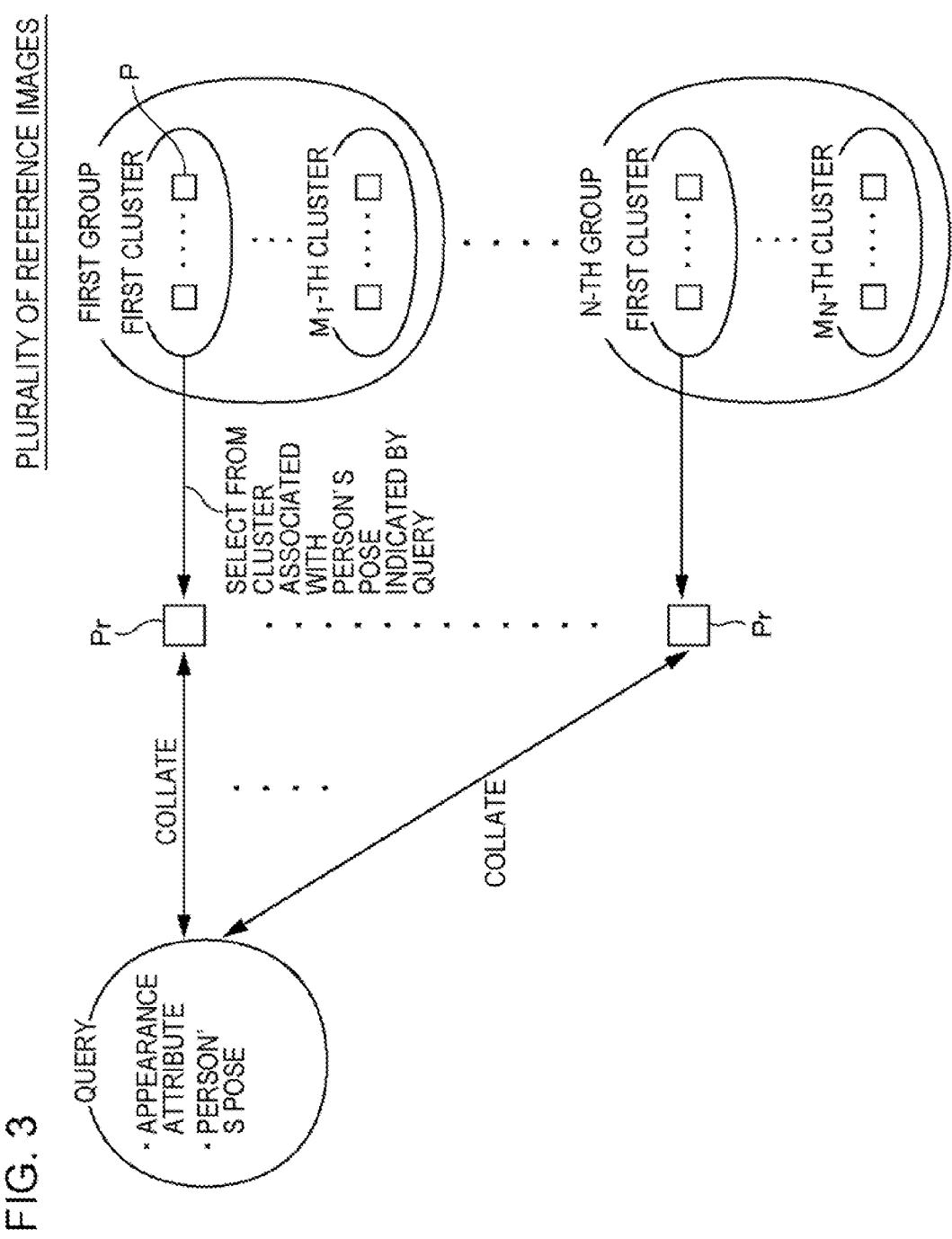
FIG. 3 is a diagram for describing an overview of processing of the image processing apparatus.

Then, the image processing apparatus 10 selects a representative reference image from each group with a characteristic approach, and collates the selected representative reference image in each group with a query. Specifically, the image processing apparatus 10 selects, for each group, a representative reference image $P_r$ from a cluster associated with a person's pose indicated by a query, as illustrated in FIG. 3. That is, when a query indicates a "standing pose" as a person's pose, the image processing apparatus 10 selects a representative reference image $P_r$ from a cluster associated with a standing pose. Note that, the image processing apparatus 10 selects no representative reference image $P_r$ from a cluster not associated with a person's pose indicated by a query.

Then, the image processing apparatus 10 collates the representative reference image $P_r$ in each group selected with such a characteristic approach with a query. Hereinafter, a configuration of the image processing apparatus 10 will be described in more detail.

"Hardware Configuration"

Next, one example of a hardware configuration of the image processing apparatus 10 will be described. Each function unit of the image processing apparatus 10 is achieved by any combination of hardware and software, mainly including a central processing unit (CPU) of any computer, a memory, a program to be loaded in a memory, a storage unit (in which a program downloaded from a storage medium such as a compact disc (CD), a server on the Internet, or the like can be stored as well as a program stored in advance in a stage of shipping an apparatus) such as a hard disk for storing the program, and an interface for network connection. In addition, it should be understood by a person skilled in the art that there are a variety of modified examples of a method or an apparatus for achieving the same.

Figure 4:
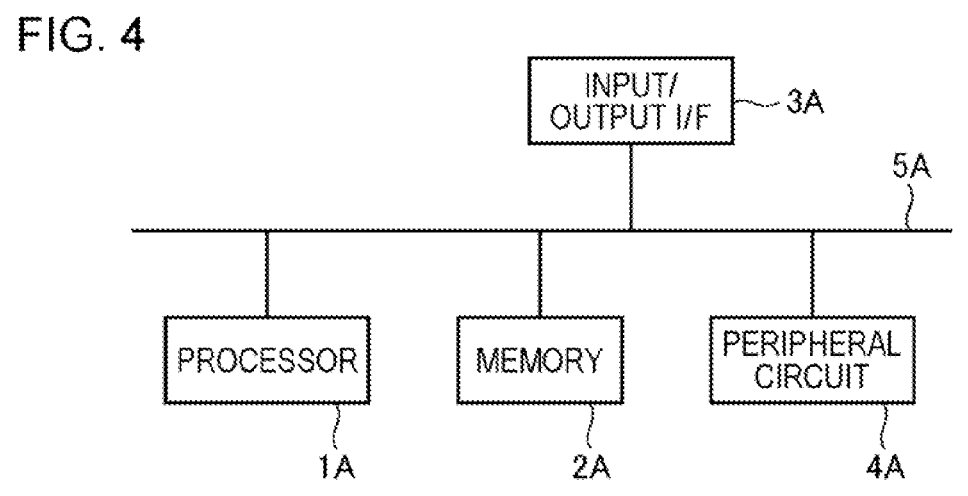

FIG. 4 is a block diagram illustrating a hardware configuration of the image processing apparatus 10. As illustrated in FIG. 4, the image processing apparatus 10 includes a processor 1A, a memory 2A, an input/output interface 3A, a peripheral circuit 4A, and a bus 5A. The peripheral circuit 4A includes various modules. The image processing apparatus 10 may not include the peripheral circuit 4A. Note that, the image processing apparatus 10 may be configured by a plurality of physically and/or logically separated apparatuses. In this case, each of the plurality of apparatuses can include the above hardware configuration.

The bus 5A is a data transmission path through which the processor 1A, the memory 2A, the peripheral circuit 4A, and the input/output interface 3A transmit and receive data to and from one another. The processor 1A is an arithmetic processing apparatus such as, for example, a CPU or a graphics processing unit (GPU). The memory 2A is a memory such as, for example, a random access memory (RAM) or a read only memory (ROM). The input/output interface 3A includes an interface for acquiring information from an input apparatus, an external apparatus, an external server, an external sensor, a camera, and the like, an interface for outputting information to an output apparatus, an external apparatus, an external server, and the like, and the like. The input apparatus is, for example, a keyboard, a mouse, a microphone, a physical button, a touch panel, and the like. The output apparatus is, for example, a display, a speaker, a printer, a mailer, and the like. The processor 1A can give an instruction to each module to perform an arithmetic operation, based on an arithmetic operation result thereof "Function Configuration"

Next, a function configuration of the image processing apparatus 10 according to the second example embodiment will be described in detail. FIG. 1 illustrates one example of a function block diagram of the image processing apparatus 10. As illustrated, the image processing apparatus 10 includes an acquisition unit 11 and a search unit 12.

The acquisition unit 11 acquires a query. A query includes a person attribute and a predetermined attribute.

A "person attribute" is an attribute of a person desired to be searched for. A person attribute in the present example embodiment is a person's appearance attribute. Note that, a modified example of a person attribute will be described below. The search unit 12 to be described below performs collation between a query and a representative reference image, based on the person attribute. That is, the search unit 12 determines whether a person included in a representative reference image includes a person attribute indicated by a query.

A "person's appearance attribute" is an attribute that can be determined from a person's appearance, that is, an attribute that can be determined by an image analysis. For example, a person's appearance attribute includes at least one of age, gender, a feature of a wearable article, a body shape, nationality, and a hairstyle. A feature of a wearable article indicates presence/absence of a wearable article of a predetermined type, a color of a wearable article, a pattern of a wearable article, a shape of a wearable article, or the like. A type of a wearable article is, but not limited to, a garment, a hat, a mask, glasses, sunglasses, or the like.

A "predetermined attribute" is information for use in clustering reference image groups belonging to each group. The search unit 12 to be described below decides a cluster from which a representative reference image is selected, based on a predetermined attribute indicated by a query.

A predetermined attribute in the present example embodiment is a person's pose. Note that, a modified example of a predetermined attribute will be described below. A person's pose can be classified as, for example, a standing pose, a sitting pose, or a sleeping pose. Besides the above, a person's pose can also be classified as a standing pose with right hand raised, a standing pose with left hand raised, or the like. There are various ways of classifying a person's pose.

Herein, a way of acquiring a query including information as described above will be described. The acquisition unit 11 can acquire a query, for example, by using any of following first to third acquisition examples.

First Acquisition Example

In the example, the acquisition unit 11 acquires a still image as a query. Then, the acquisition unit 11 analyzes the still image, detects a person in the image, and detects an appearance attribute or a pose of the detected person. Detection of a person, detection of an appearance attribute, and detection of a pose can be achieved by using any possible conventional technique.

Second Acquisition Example

In the example, the acquisition unit 11 acquires a moving image as a query. The acquisition unit 11 selects a representative frame image from the moving image. Then, the acquisition unit 11 analyzes the representative frame image, detects a person in the image, and detects an appearance attribute or a pose of the detected person. Detection of a person, detection of an appearance attribute, and detection of a pose can be achieved by using any possible conventional technique. As a method of selecting a representative frame image, any possible approach can be employed, one example of which will be described in a following example embodiment.

Third Acquisition Example

In the example, the acquisition unit 11 acquires a query specifying a person's appearance attribute or a pose in text. For example, the acquisition unit 11 may accept a user input to select one or a plurality from among predetermined options (options of an appearance attribute, options of a pose), by using a user interface (UI) part such as a drop-down list. Besides the above, the acquisition unit 11 may accept a user input to specify an appearance attribute or a pose in free description, by using a UI part such as a text box. When specification in free description is employed, the acquisition unit 11 may change a content of user's description into a content of description suitable for processing by the search unit 12, by using a word conversion dictionary prepared in advance.

The search unit 12 refers to a reference image database, and selects, for each group, a representative reference image from one or each of a plurality of clusters. Then, the search unit 12 collates the selected representative reference image with a query, based on a person attribute indicated by the query. That is, the search unit 12 determines whether a person included in the selected representative reference image includes a person attribute indicated by a query.

First, a reference image database will be described. A reference image database stores a plurality of reference images. A plurality of reference images may be a plurality of frame images included in a moving image, or may be a plurality of still images.

In a reference image database, a plurality of reference images P are grouped by putting together into reference images P including an identical person, as illustrated in FIG. 2. Further, in a reference image database, reference image P groups belonging to each group are clustered by putting together those having a similar predetermined attribute (a "person's pose" in the present example embodiment). A "plurality of reference images having a predetermined attribute similar to each other" are a plurality of reference images having a predetermined attribute matching each other, a plurality of reference images having a predetermined attribute not matching each other but having a mutual relationship of a predetermined attribute satisfying a similarity condition determined in advance, a plurality of reference images having a mutual difference of a predetermined attribute being equal to or less than a threshold value, or the like.

In a reference image database, reference image identification information identifying each of a plurality of reference images, group identification information of a group to which each reference image belongs, and cluster identification information of a cluster to which each reference image belongs are registered in association with one another, as illustrated in FIG. 5.

A reference image database as described above may be created by analyzing a reference image by the image processing apparatus 10. Besides the above, a reference image database as described above may be created by analyzing a reference image by an external apparatus different from the image processing apparatus 10.

Grouping of a reference image can be achieved by using any possible conventional technique. For example, an identical person captured across a plurality of reference images may be determined by using a well-known face recognition technique. Besides the above, when a plurality of reference images are a plurality of frame images included in a moving image, an identical person captured across a plurality of frame images may be determined by using a well-known person tracking technique.

Further, clustering of a reference image can be also achieved by using any possible conventional technique. For example, a person's pose included in each of a plurality of reference images may be detected by using a well-known pose detection technique. Then, reference images including an identical pose may be put together and clustered. Further, clustering of putting together reference images including an identical pose may be achieved by using the technique disclosed in International Publication No. WO 2021/229751.

Next, processing of selecting a representative reference image for each group will be described.

In the present example embodiment, a query acquired by the acquisition unit 11 indicates a person's appearance attribute (a person attribute) and a person's pose (a predetermined attribute), as described above. The search unit 12 decides a cluster from which a representative reference image is selected, based on a person's pose (a predetermined attribute) indicated by a query. Specifically, the search unit 12 decides a cluster associated with a person's pose (a predetermined attribute) indicated by a query, as a cluster from which a representative reference image is selected. Then, the search unit 12 selects, for each group, a representative reference image from the decided cluster. That is, when a query indicates a "standing pose" as a person's pose, the search unit 12 selects a representative reference image from a cluster in each group associated with a standing pose. Further, when a query indicates a "sitting pose" as a person's pose, the search unit 12 selects a representative reference image from a cluster in each group associated with a sitting pose.

One representative reference image may be selected from each cluster, or a plurality of representative reference images may be selected from each cluster. An approach for selecting a representative reference image from each cluster is not particularly limited. For example, the search unit 12 may randomly select a representative reference image, or may select a representative reference image, based on a predetermined rule determined in advance.

After selecting a representative reference image for each group, the search unit 12 collates each representative reference image with a query, based on a person's appearance attribute (a person attribute) indicated by the query. That is, the search unit 12 searches for a representative reference image including a person with a person's appearance attribute indicated by a query, from among representative reference images.

Figure 6:
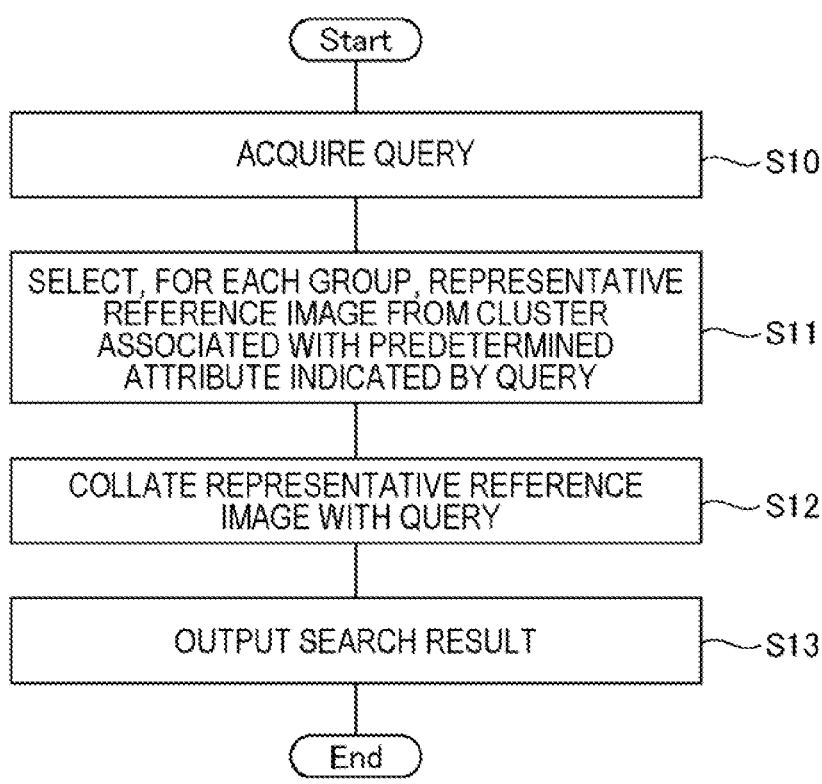
FIG. 6 is a flowchart illustrating one example of a flow of processing of the image processing apparatus.

Next, one example of a flow of processing of the image processing apparatus 10 will be described by using a flowchart in FIG. 6.

First, when the image processing apparatus 10 acquires a query indicating a person's appearance attribute (a person attribute) and a person's pose (a predetermined attribute) (S10), the image processing apparatus 10 refers to a reference image database, and selects, for each group, a representative reference image from a cluster associated with the person's pose (the predetermined attribute) indicated by the query (S11).

Then, the image processing apparatus 10 collates the selected representative reference image with the query, based on the person's appearance attribute (the person attribute) indicated by the query (S12). In the collation, the image processing apparatus 10 searches for a representative reference image including a person with the person's appearance attribute indicated by the query, from among representative reference images.

Then, the image processing apparatus 10 outputs a result of search in S12 (S13). For example, the image processing apparatus 10 outputs, as a result of search, a representative reference image including a person with the person's appearance attribute indicated by the query. Further, the image processing apparatus 10 may output, as a result of search, a reference image belonging to a same group and a same cluster as a representative reference image including a person with the person's appearance attribute indicated by the query.

Modified Example

Next, a modified example of the image processing apparatus 10 according to the present example embodiment will be described.

In the above-described example embodiment, a "person attribute" for use in collation between a query and a representative reference image is a "person's appearance attribute", and a "predetermined attribute" for use in clustering of a reference image or decision of a cluster from which a representative reference image is selected is a "person's pose". However, a combination of a "person attribute" and a "predetermined attribute" is not limited thereto, but can also be another content.

Specifically, a "person attribute" can be a person's appearance attribute or a person's pose.

A "predetermined attribute" can be at least one of a person's pose, a person's appearance attribute, a position in an image where a person is present, a photographing time zone, a photographing place, a model of a photographing camera, and a type of a key point on a person's body detected from an image.

In addition, various kinds of combinations of the above can be employed.

For example, a "person attribute" can be a person's appearance attribute, and a "predetermined attribute" can be at least one of a person's pose, a position in an image where a person is present, a photographing time zone, a photographing place, a model of a photographing camera, and a type of a key point on a person's body detected from an image.

As another example, a "person attribute" can be a person's pose, and a "predetermined attribute" can be at least one of a person's appearance attribute, a position in an image where a person is present, a photographing time zone, a photographing place, a model of a photographing camera, and a type of a key point on a person's body detected from an image.

A "position in an image where a person is present" indicates where within each reference image a person within each reference image is. For example, a reference image may be divided into M areas, and an area where a predetermined part (example: a face, a foot, or the like) of a person's body is present may be determined as a position in an image where a person is present.

A "photographing time zone" indicates a time zone in which each reference image is photographed. For example, a day may be divided into N time zones, and a time zone including a time at which each photographed image is photographed may be determined as a photographing time zone. A time at which each reference image is photographed can be determined based on metadata attached to a reference image.

A "photographing place" indicates a place where each reference image is photographed. For example, a photographing place may be indicated by a place name, an address, or the like. In this case, a photographing place of each reference image can be determined based on metadata attached to a reference image. Besides the above, a photographing place may be indicated by a classification defined by any means, such as "indoor" or "outdoor". In this case, a photographing place of each reference image may be determined, for example, by analyzing a reference image.

A "model of a photographing camera" can be determined based on metadata attached to a reference image.

Figure 11:
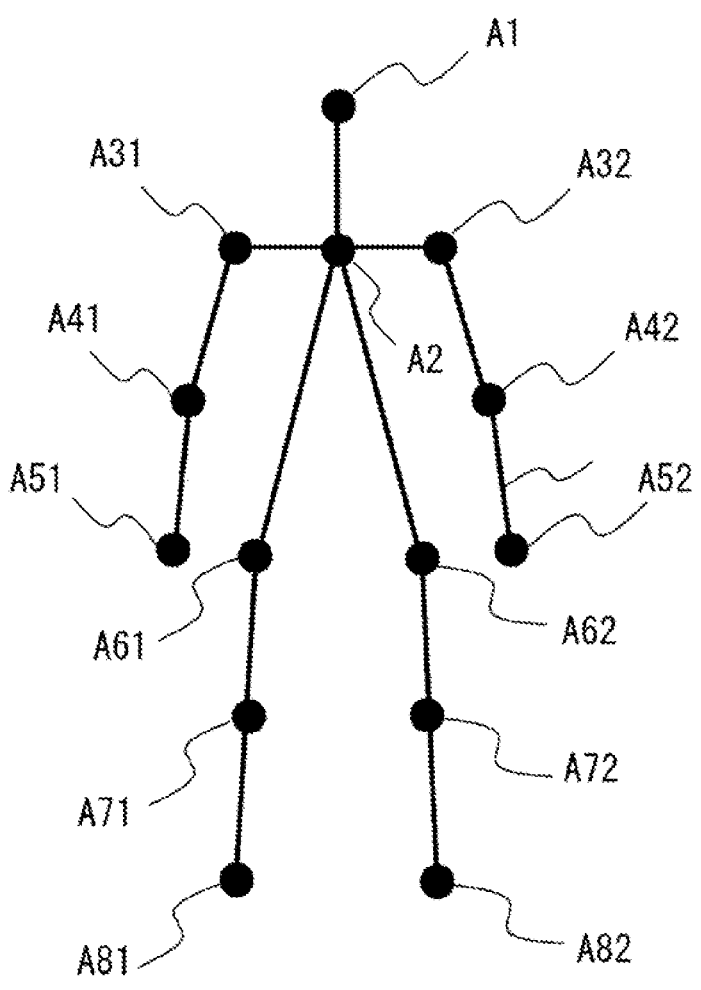
FIG. 11 is a diagram describing one example of a key point to be detected.

A "type of a key point on a person's body detected from an image" is a type of a key point on a person's body detected in processing of determining a person's pose. In processing of determining a person's pose, various kinds of key points associated with joints or the like are detected. Then, a pose is determined based on a result of the detection. For example, as various kinds of key points, a head A1, a neck A2, a right shoulder A31, a left shoulder A32, a right elbow A41, a left elbow A42, a right hand A51, a left hand A52, a right hip A61, a left hip A62, a right knee A71, a left knee A72, a right foot A81, a left foot A82, and the like are detected, as illustrated in FIG. 11. A key point of a body is undetected when a joint point is hidden due to a reason such as overlapping with another person or an object or being partially cut off at an edge of an image. For example, when only an upper body of a person is captured at a lower edge of an image, a key point relating to a lower body is undetected. Accordingly, it can be determined that persons with a same type of a detected key point of a body have a same hidden part.

In clustering of a reference image, reference images having one similar predetermined attribute among predetermined attributes as described above may be put together. Besides the above, in clustering of a reference image, reference images having a plurality of similar predetermined attributes among predetermined attributes as described above may be put together.

"Advantageous Effect"

The image processing apparatus 10 according to the present example embodiment puts together and groups into reference images including an identical person, refers to a reference image database in which reference image groups belonging to each group are clustered by putting together those having a similar predetermined attribute, selects, for each group, a representative reference image from one or each of a plurality of clusters, and collates the selected representative reference image with a query. According to the image processing apparatus 10 as described above, the number of reference images to be collated with a query can be reduced. Consequently, a processing load on a computer can be reduced.

Further, the image processing apparatus 10 selects, for each group, a representative reference image from a cluster associated with a predetermined attribute indicated by a query.

Incidentally, when a content of a predetermined attribute is different, a person attribute indicated by a query may look different. For example, a person's appearance attribute such as age, gender, a feature of a wearable article, a body shape, nationality, or a hairstyle may look different, according to a person's pose, a position in an image where a person is present, a photographing time zone, a photographing place, a model of a photographing camera, a type of a key point on a person's body detected from an image, or the like.

Further, a person's appearance attribute such as age, gender, a feature of a wearable article, a body shape, nationality, or a hairstyle may look different, according to a person's appearance attribute, a position in an image where a person is present, a photographing time zone, a photographing place, a model of a photographing camera, a type of a key point on a person's body detected from an image, or the like.

When a representative reference image is randomly selected from each group without considering the above, a desired collation result may not be acquired. This inconvenience can be prevented by selecting, for each group, a representative reference image from a cluster associated with a predetermined attribute indicated by a query, as in the image processing apparatus 10 according to the present example embodiment.

Third Example Embodiment

In a present example embodiment, a query does not indicate a predetermined attribute. Thus, an image processing apparatus 10 selects a representative reference image for each group with an approach different from the approach in the second example embodiment (selecting a representative reference image from a cluster associated with a predetermined attribute indicated by a query). Hereinafter, description will be given in detail.

Figure 7:
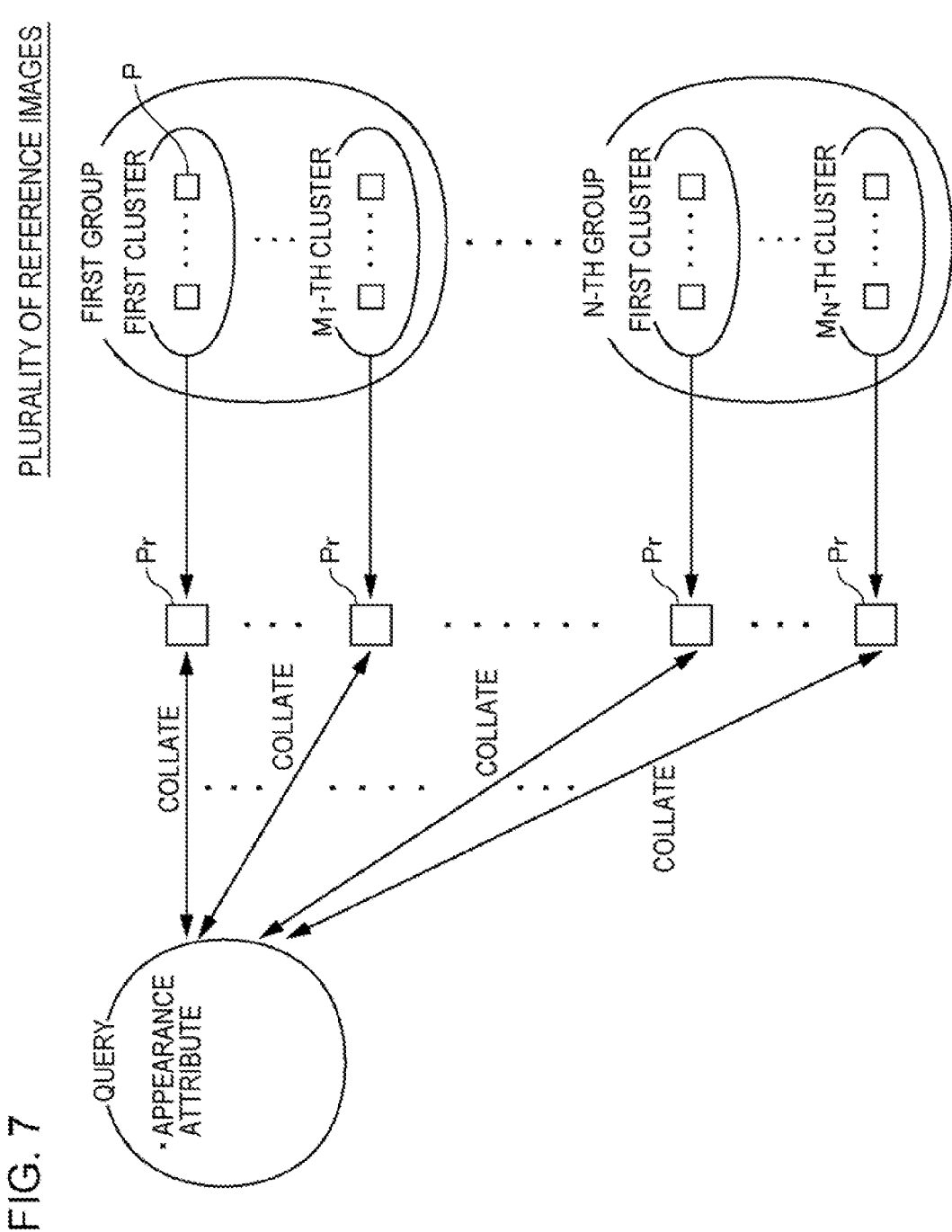
FIG. 7 is a diagram for describing an overview of another piece of processing of the image processing apparatus.

A search unit 12 selects, for each group, a representative reference image $P_r$ from each of a plurality of clusters belonging to each group, as illustrated in FIG. 7. Then, the search unit 12 collates the selected representative reference image $P_r$ with a query, based on a person attribute indicated by the query. Processing of selecting a representative reference image $P_r$ from each cluster and processing of collating the selected representative reference image $P_r$ with a query have been described in the second example embodiment, and thus, description thereof is omitted here.

Figure 8:
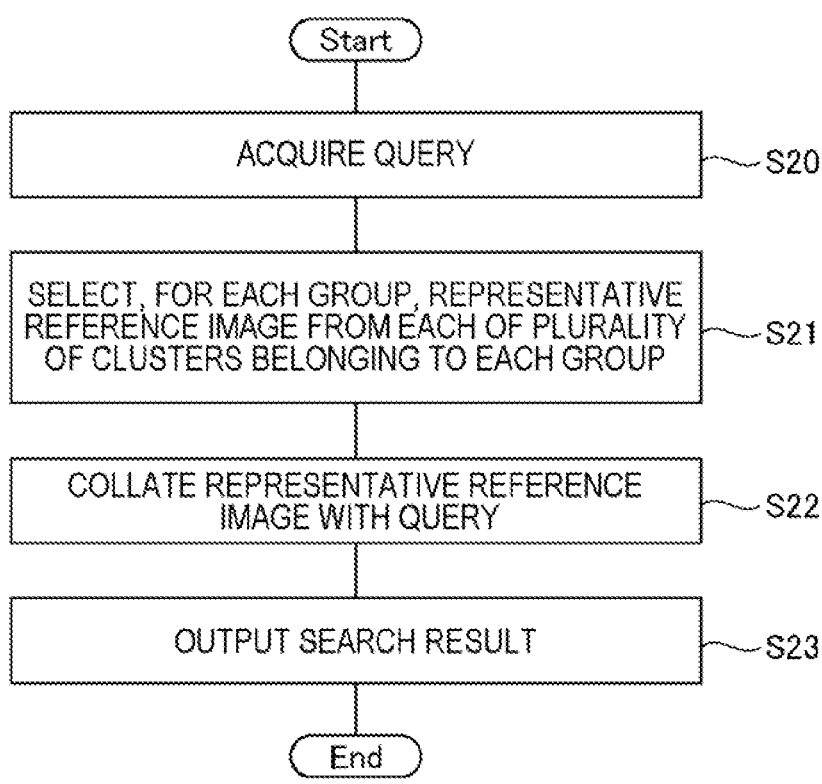
FIG. 8 is a flowchart illustrating another example of a flow of processing of the image processing apparatus.

Next, one example of a flow of processing of the image processing apparatus 10 will be described by using a flowchart in FIG. 8.

First, when the image processing apparatus 10 acquires a query indicating a person's appearance attribute (a person attribute) (S20), the image processing apparatus 10 refers to a reference image database, and selects, for each group, a representative reference image from each of a plurality of clusters belonging to each group (S21).

Then, the image processing apparatus 10 collates the selected representative reference image with the query, based on the person's appearance attribute (the person attribute) indicated by the query (S22). In the collation, the image processing apparatus 10 searches for a representative reference image including a person with the person's appearance attribute indicated by the query, from among representative reference images.

Then, the image processing apparatus 10 outputs a result of search in S22 (S23). For example, the image processing apparatus 10 outputs, as a result of search, a representative reference image including a person with the person's appearance attribute indicated by the query. Further, the image processing apparatus 10 may output, as a result of search, a reference image belonging to a same group as a representative reference image including a person with the person's appearance attribute indicated by the query.

Figure 9:
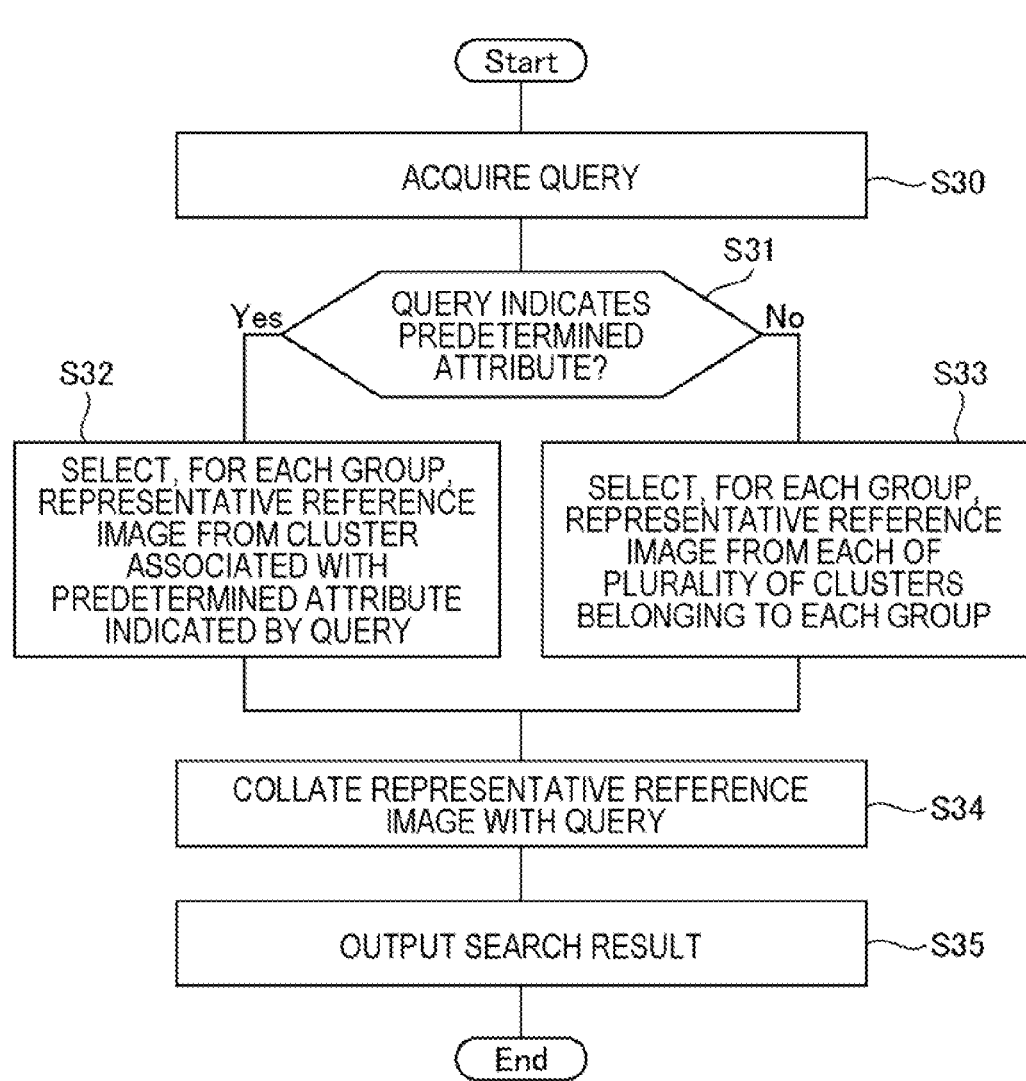
FIG. 9 is a flowchart illustrating another example of a flow of processing of the image processing apparatus.

Next, another example of a flow of processing of the image processing apparatus 10 will be described by using a flowchart in FIG. 9. The processing example indicates one example of a flow of processing that combines the processing described in the second example embodiment with the above-described processing in the present example embodiment.

First, when the image processing apparatus 10 acquires a query indicating at least a person's appearance attribute (a person attribute) (S30), the image processing apparatus 10 determines whether the acquired query indicates a person's pose (a predetermined attribute) (S31).

When the query indicates a person's pose (a predetermined attribute) (Yes in S31), the image processing apparatus 10 refers to a reference image database, and selects, for each group, a representative reference image from a cluster associated with the person's pose (the predetermined attribute) indicated by the query (S32).

On the other hand, when the query does not indicate a person's pose (a predetermined attribute) (No in S31), the image processing apparatus 10 refers to a reference image database, and selects, for each group, a representative reference image from each of a plurality of clusters belonging to each group (S33).

Then, the image processing apparatus 10 collates the selected representative reference image with the query, based on the person's appearance attribute (the person attribute) indicated by the query (S34). Then, the image processing apparatus 10 outputs a result of search in S34 (S35). Processing in S34 and S35 is as described by using the flowcharts in FIGS. 6 and 8.

Other configurations of the image processing apparatus 10 according to the present example embodiment are similar to the first and second example embodiments. Note that, the image processing apparatus 10 according to the present example embodiment can also employ the modified example described in the second example embodiment.

As described above, the image processing apparatus 10 according to the present example embodiment can achieve an advantageous effect similar to the first and second example embodiments. Further, the image processing apparatus 10 according to the present example embodiment can appropriately select a representative reference image from each group and can collate the selected representative reference image with a query, even when a predetermined attribute is not indicated by the query. Consequently, a processing load on a computer can be reduced while a desired result of search is achieved.

Fourth Example Embodiment

In a present example embodiment, a query indicates a predetermined attribute. However, an image processing apparatus 10 selects a representative reference image for each group with the approach in the third example embodiment (selecting a representative reference image from each cluster) rather than the approach in the second example embodiment (selecting a representative reference image from a cluster associated with a predetermined attribute indicated by a query). Then, the image processing apparatus 10 assigns a weight to each of a plurality of selected representative reference images, based on the predetermined attribute indicated by the query, and performs a search in consideration of the weight. Hereinafter, description will be given in detail.

A search unit 12 selects, for each group, a representative reference image $P_r$ from each of a plurality of clusters belonging to each group, as illustrated in FIG. 7. Then, the search unit 12 collates the selected representative reference image $P_r$ with a query, based on a person attribute indicated by the query. Processing of selecting a representative reference image $P_r$ from each cluster and processing of collating the selected representative reference image $P_r$ with a query have been described in the second example embodiment, and thus, description thereof is omitted here.

Further, the search unit 12 assigns a weight to each of a plurality of selected representative reference images, based on the predetermined attribute indicated by the query. The search unit 12 assigns a relatively large weight to a representative reference image selected from a cluster associated with the predetermined attribute indicated by the query, and assigns a relatively small weight to a representative reference image selected from a cluster not associated with the predetermined attribute indicated by the query.

Then, the search unit 12 computes, for each group, a score indicating a degree of similarity to the query, based on a result of collation between the representative reference image and the query and the above weight.

Herein, one example of processing of computing a score for a first group will be specifically described. First, the search unit 12 computes an individual score for each representative reference image, based on a degree of similarity between each of a plurality of representative reference images selected from the first group and a query, and a weight of each representative reference image. A specific method of computation is not particularly limited, but computation is performed in such a way that the larger a degree of similarity and the larger a weight, the higher an individual score.

Then, the search unit 12 computes, as a score for the above first group, a statistical value (example: a mean value, a maximum value, a mode value, a minimum value, a median value, or the like) of an individual score for each of a plurality of representative reference images selected from the first group.

Then, the search unit 12 outputs a reference image included in a group for which the above score satisfies a predetermined condition, as a reference image including a person with a person's appearance attribute indicated by the query. Examples of a predetermined condition for a score include, but not limited to, "equal to or more than a reference value".

Other configurations of the image processing apparatus 10 according to the present example embodiment are similar to the first to third example embodiments. Note that, the image processing apparatus 10 according to the present example embodiment can also employ the modified example described in the second example embodiment.

As described above, the image processing apparatus 10 according to the present example embodiment can achieve an advantageous effect similar to the first to third example embodiments. Further, the image processing apparatus 10 according to the present example embodiment can search for a desired person from among reference images with a characteristic approach. Consequently, a processing load on a computer can be reduced while a desired result of search is achieved.

Fifth Example Embodiment

An image processing apparatus 10 according to a present example embodiment acquires, as a query, a moving image including a person. Then, the image processing apparatus selects a representative frame image to be collated with a representative reference image from among a plurality of frame images included in the moving image, by using an approach for grouping and clustering described in the first to fourth example embodiments. Hereinafter, description will be given in detail.

An acquisition unit 11 acquires a moving image including a person as a query.

Figure 10:
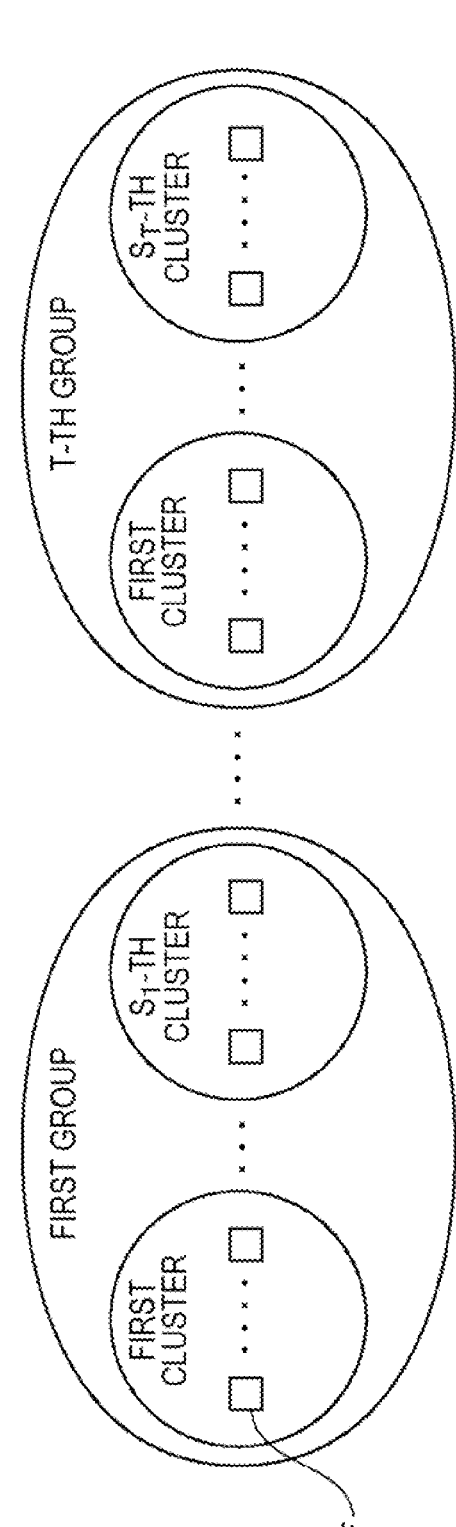
FIG. 10 is a diagram for describing grouping and clustering of a plurality of frame images.

A search unit 12 groups a plurality of frame images F included in the moving image by putting together into frame images F including an identical person, and clusters frame image groups belonging to each group by putting together those having a similar predetermined attribute, as illustrated in FIG. 10. Then, the search unit 12 selects, for each group, a representative frame image from one or each of a plurality of clusters, and collates the selected representative frame image with a representative reference image.

Grouping and clustering of a plurality of frame images are achieved by the same approach as grouping and clustering of a plurality of reference images described in the first to fourth example embodiments.

Next, processing of selecting a representative frame image will be described. For example, the search unit 12 may select, for each group, a representative frame image from each of a plurality of clusters belonging to each group. One representative frame image may be selected from each cluster, or a plurality of representative frame images may be selected from each cluster. An approach for selecting a representative frame image from each cluster is not particularly limited. For example, the search unit 12 may randomly select a representative frame image, or may select a representative frame image, based on a predetermined rule determined in advance.

Besides the above, the search unit 12 may select, for each group, a candidate for a representative frame image from each of a plurality of clusters belonging to each group. The search unit 12 outputs a selected candidate for a representative frame image toward a user. Then, the search unit 12 selects, as a representative frame image, a frame image specified by the user from among the candidates. One candidate for a representative frame image may be selected from each cluster, or a plurality of candidates for a representative frame image may be selected from each cluster. An approach for selecting a candidate for a representative frame image from each cluster is not particularly limited. For example, the search unit 12 may randomly select a candidate for a representative frame image, or may select a candidate for a representative frame image, based on a predetermined rule determined in advance.

Other configurations of the image processing apparatus 10 according to the present example embodiment are similar to the first to fourth example embodiments. Note that, the image processing apparatus 10 according to the present example embodiment can also employ the modified example described in the second example embodiment.

As described above, the image processing apparatus 10 according to the present example embodiment can achieve an advantageous effect similar to the first to fourth example embodiments. Further, the image processing apparatus 10 according to the present example embodiment can select, with a characteristic approach, a representative frame image to be collated with a representative reference image from a query being a moving image. Consequently, a processing load on a computer can be reduced while selection of a desired representative frame image is achieved.

While the example embodiments of the present invention have been described above with reference to the drawings, the example embodiments are exemplifications of the present invention, and various configurations other than the above can be employed. The configurations of the above-described example embodiments may be combined with each another, or a part of the configurations may be replaced with another configuration. Further, various modifications may be applied to the configurations of the above-described example embodiments, as long as such modifications do not depart from the gist. Further, the configurations and processing disclosed in the above-described example embodiments and the modified examples may be combined with each other.

Further, while a plurality of processes (pieces of processing) are described in order in a plurality of flowcharts used in the above description, execution order of processes executed in each example embodiment is not limited to the described order. The order of the illustrated processes can be changed in each example embodiment, as long as the change does not detract from contents. Further, the above example embodiments can be combined, as long as contents do not contradict each other.

The above example embodiments may also be described in part or in whole as the following supplementary notes, but are not limited thereto.

1. An image processing apparatus including:
   an acquisition means for acquiring a query indicating a person attribute; and
   a search means for referring to a reference image database in which a plurality of reference images are grouped by putting together into reference images including an identical person and clustered, for each group, by putting together those having a similar predetermined attribute, selecting, for each group, a representative reference image from one or each of a plurality of clusters, and collating the selected representative reference image with the query, based on the person attribute.

2. The image processing apparatus according to supplementary note 1, wherein
   the query further indicates the predetermined attribute, and
   the search means selects, for each of the groups, the representative reference image from the cluster associated with the predetermined attribute indicated by the query, and collates the selected representative reference image with the query, based on the person attribute indicated by the query.

3. The image processing apparatus according to supplementary note 1, wherein
   the search means selects, for each of the groups, the representative reference image from each of a plurality of the clusters belonging to each of the groups, and collates the selected representative reference image with the query, based on the person attribute indicated by the query.

4. The image processing apparatus according to any of supplementary notes 1 to 3, wherein
   the person attribute indicates a person's appearance attribute or a person's pose.

5. The image processing apparatus according to supplementary note 4, wherein
   the person's appearance attribute includes at least one of age, gender, a feature of a wearable article, a body shape, nationality, and a hairstyle.

6. The image processing apparatus according to any of supplementary notes 1 to 3, wherein
the predetermined attribute includes at least one of a person's pose, a person's appearance attribute, a position in an image where a person is present, a photographing time zone, a photographing place, a model of a photographing camera, and a type of a key point on a person's body detected from an image.

7. The image processing apparatus according to supplementary note 6, wherein
the person attribute includes a person's appearance attribute, and
the predetermined attribute includes at least one of a person's pose, a position in an image where a person is present, a photographing time zone, a photographing place, a model of a photographing camera, and a type of a key point on a person's body detected from an image.

8. The image processing apparatus according to supplementary note 7, wherein
the query indicates a person's appearance attribute and a person's pose,
the predetermined attribute includes a person's pose, and
the search means selects, for each of the groups, the representative reference image from the cluster associated with a person's pose indicated by the query, and collates the selected representative reference image with the query, based on a person's appearance attribute indicated by the query.

9. The image processing apparatus according to any of supplementary notes 1 to 7, wherein
the acquisition means acquires, as the query, a moving image including a person, and
the search means
groups a plurality of frame images included in the moving image by putting together into frame images including an identical person, and clusters frame image groups belonging to each group by putting together those having a similar predetermined attribute, and
selects, for each group, a representative frame image from one or each of a plurality of clusters, and collates a selected representative frame image with the representative reference image.

10. An image processing method including,
by one or more computers:
acquiring a query indicating a person attribute; and
referring to a reference image database in which a plurality of reference images are grouped by putting together into reference images including an identical person and clustered, for each group, by putting together those having a similar predetermined attribute, selecting, for each group, a representative reference image from one or each of a plurality of clusters, and collating the selected representative reference image with the query, based on the person attribute.

11. A program causing a computer to function as:
an acquisition means for acquiring a query indicating a person attribute; and
a search means for referring to a reference image database in which a plurality of reference images are grouped by putting together into reference images including an identical person and clustered, for each group, by putting together those having a similar predetermined attribute, selecting, for each group, a representative reference image from one or each of a plurality of clusters, and collating the selected representative reference image with the query, based on the person attribute.

10 Image processing apparatus
11 Acquisition unit
12 Search unit
1A Processor
2A Memory
3A Input/output I/F
4A Peripheral circuit
5A Bus

The invention claimed is:

1. An image processing apparatus comprising:
at least one memory configured to store one or more instructions; and
at least one processor configured to execute the one or more instructions to:
group a plurality of reference images into one or more groups, wherein each group of the one or more groups comprises one or more first reference images from the plurality of reference images, the one or more first reference images corresponding to a same person;
cluster the one or more first reference images in each of the one or more groups into one or more clusters, wherein each cluster of the one or more clusters comprises one or more second reference images from the one or more first reference images, the one or more second reference images having a similar predetermined attribute based on (i) matching, (ii) a similarity condition, or (iii) a mutual difference with respect to a threshold value;
create a reference image database by associating reference image identification information for the plurality of reference images with group identification information for the one or more groups and cluster identification information for the one or more clusters;
acquire a query indicating a person attribute;
select, for each group of the one or more groups, one or more representative reference images by:
based on the query further indicating the predetermined attribute, selecting the one or more representative reference images from a cluster of the one or more clusters associated with the predetermined attribute; and
based on the query not indicating the predetermined attribute, selecting the one or more representative reference images from each cluster of the one or more clusters associated with each group;
collate the one or more selected representative reference images with the query, based on the person attribute by identifying, from among the one or more selected representative reference images, a target representative reference image that comprises a person having the person attribute indicated in the query; and
output, based on the target representative reference image, a search result comprising at least one of the plurality of reference images belonging to a same group and a same cluster as the target representative reference image.

2. The image processing apparatus according to claim 1, wherein the person attribute indicates a person's appearance attribute or a person's pose.

3. The image processing apparatus according to claim 2, wherein the person's appearance attribute includes at least one of age, gender, a feature of a wearable article, a body shape, nationality, and a hairstyle.

4. The image processing apparatus according to claim 1, wherein the predetermined attribute includes at least one of a person's pose, a person's appearance attribute, a position in an image where a person is present, a photographing time zone, a photographing place, a model of a photographing camera, and a type of a key point on a person's body detected from an image.

5. The image processing apparatus according to claim 4, wherein the person attribute includes a person's appearance attribute, and the predetermined attribute includes at least one of a person's pose, a position in an image where a person is present, a photographing time zone, a photographing place, a model of a photographing camera, and a type of a key point on a person's body detected from an image.

6. The image processing apparatus according to claim 5, wherein the query indicates a person's appearance attribute and a person's pose.

7. The image processing apparatus according to claim 1, wherein the at least one processor is further configured to execute the one or more instructions to acquire, as the query, a moving image including a person, group a plurality of frame images included in the moving image into one or more frame groups, wherein each frame group comprises one or more first frame images from the plurality of frame images, the one or more first frame images corresponding to a same person, and cluster the one or more first frame images in each of the one or more frame groups into one or more frame clusters, wherein each frame cluster comprises one or more second frame images from the one or more first frame images, the one or more second frame images having a similar predetermined attribute, select, for each frame group, one or more representative frame images from a cluster of the one or more frame clusters, and collate the one or more selected representative frame images with the one or more selected representative reference images.

8. The image processing apparatus according to claim 1, wherein the plurality of reference images correspond to a moving image having a duration of at least one hour at 30 or more frames per second.

9. The image processing apparatus according to claim 1, wherein the target representative reference image is identified, from among the one or more selected representative reference images, based on a predetermined rule.

10. The image processing apparatus according to claim 1, wherein the target representative reference image is identified by randomly selecting an image from among the one or more selected representative reference images.

11. An image processing method, performed by one or more computers, the method comprising:

grouping a plurality of reference images into one or more groups, wherein each group of the one or more groups comprises one or more first reference images from the plurality of reference images, the one or more first reference images corresponding to a same person;

clustering the one or more first reference images in each of the one or more groups into one or more clusters, wherein each cluster of the one or more clusters comprises one or more second reference images from the one or more first reference images, the one or more second reference images having a similar predetermined attribute based on (i) matching, (ii) a similarity condition, or (iii) a mutual difference with respect to a threshold value;

creating a reference image database by associating reference image identification information for the plurality of reference images with group identification information for the one or more groups and cluster identification information for the one or more clusters;

acquiring a query indicating a person attribute;

selecting, for each group of the one or more groups, one or more representative reference images by:

based on the query further indicating the predetermined attribute, selecting the one or more representative reference images from a cluster of the one or more clusters associated with the predetermined attribute; and based on the query not indicating the predetermined attribute, selecting the one or more representative reference images from each cluster of the one or more clusters associated with each group;

collating the one or more selected representative reference images with the query, based on the person attribute by identifying, from among the one or more selected representative reference images, a target representative reference image that comprises a person having the person attribute indicated in the query; and outputting, based on the target representative reference image, a search result comprising at least one of the plurality of reference images belonging to a same group and a same cluster as the target representative reference image.

12. A non-transitory storage medium storing a program causing a computer to:

group a plurality of reference images into one or more groups, wherein each group of the one or more groups comprises one or more first reference images from the plurality of reference images, the one or more first reference images corresponding to a same person;

cluster the one or more first reference images in each of the one or more groups into one or more clusters, wherein each cluster of the one or more clusters comprises one or more second reference images from the one or more first reference images, the one or more second reference images having a similar predetermined attribute based on (i) matching, (ii) a similarity condition, or (iii) a mutual difference with respect to a threshold value;

create a reference image database by associating reference image identification information for the plurality of reference images with group identification information for the one or more groups and cluster identification information for the one or more clusters;

acquire a query indicating a person attribute;

select, for each group of the one or more groups, one or more representative reference images by:

based on the query further indicating the predetermined attribute, selecting the one or more representative reference images from a cluster of the one or more clusters associated with the predetermined attribute; and based on the query not indicating the predetermined attribute, selecting the one or more representative reference images from each cluster of the one or more clusters associated with each group;

collate the one or more selected representative reference images with the query, based on the person attribute by identifying, from among the one or more selected representative reference images, a target representative reference image that comprises a person having the person attribute indicated in the query; and output, based on the target representative reference image, a search result comprising at least one of the plurality of reference images belonging to a same group and a same cluster as the target representative reference image.

\* \* \* \* \*